US005348611A

United States Patent [19]

Lavrenge et al.

[11] Patent Number: 5,348,611

[45] Date of Patent: Sep. 20, 1994

[54] DIE PASTE TRANSFER SYSTEM AND METHOD

[75] Inventors: Edward T. Lavrenge, North Wales, Pa.; Dane C. Scott, Fairfield, Conn.

[73] Assignee: General Signal Corporation, Stamford, Conn.

[21] Appl. No.: 885,847

[22] Filed: May 20, 1992

[51] Int. Cl.[5] .......... B05C 1/00; B32B 31/00

[52] U.S. Cl. .......... 156/571; 156/356; 156/556; 156/572; 156/578; 29/740; 118/258; 118/676; 118/686; 228/6.2

[58] Field of Search .......... 156/356, 357, 578, 572, 156/571, 556; 118/676, 686, 687, 680, 258; 412/37; 29/740, 720; 427/96; 437/226, 228; 228/6.2

[56] References Cited

U.S. PATENT DOCUMENTS

| | | | |
|---|---|---|---|
| 2,328,516 | 8/1943 | von Hofe | 156/572 X |
| 2,671,912 | 3/1950 | Stein | 412/37 X |
| 3,672,326 | 6/1972 | Schulze | 118/680 X |
| 3,684,627 | 8/1972 | Hottendorf | 156/578 |
| 3,731,866 | 5/1973 | Mason et al. | 228/6.2 |
| 3,956,057 | 5/1976 | Jung | 156/578 |
| 4,310,576 | 1/1982 | Hesselmann | 118/680 X |
| 4,416,722 | 11/1983 | Bergman | 412/37 X |
| 4,538,541 | 9/1985 | Zimmer | 118/258 |
| 4,544,436 | 10/1985 | Itoh | 156/499 X |
| 4,797,994 | 1/1989 | Michaud et al. | 29/720 |
| 4,803,124 | 2/1989 | Kunz | 428/200 |
| 4,857,133 | 8/1989 | Mullen | 156/378 |
| 4,925,354 | 5/1990 | Cote | 412/37 X |
| 4,925,355 | 5/1990 | Faber | 412/37 |
| 4,974,754 | 12/1990 | Wirz | 222/207 |
| 5,057,337 | 10/1991 | Makino et al. | 427/96 |

FOREIGN PATENT DOCUMENTS

| | | | |
|---|---|---|---|
| 2140116 | 2/1973 | Fed. Rep. of Germany | 427/96 |
| 3019081 | 2/1981 | Fed. Rep. of Germany | 412/37 |
| 3218105 | 12/1982 | Fed. Rep. of Germany | 412/37 |
| 3309731 | 10/1983 | Fed. Rep. of Germany | 118/258 |
| 0236700 | 6/1986 | Fed. Rep. of Germany | 412/37 |
| 58-59064 | 4/1983 | Japan . | |
| 0066998 | 3/1989 | Japan | 427/96 |
| 64-66998 | 3/1989 | Japan . | |
| 403211849 | 9/1991 | Japan | 29/470 |
| 404342144 | 11/1992 | Japan | 29/470 |

*Primary Examiner*—David A. Simmons
*Assistant Examiner*—Charles Rainwater
*Attorney, Agent, or Firm*—Barnes & Thornburg

[57] ABSTRACT

A die paste transfer system wherein a first layer of bonding paste is transfer to a surface of the die as the die moves through the paste station in a controlled manner. The control for the transport controls orientation which the die passes through the paste station and the orientation of the die at the bonding site. The height of the die is varied as it passes through a second layer of paste. The speed at which the die and the second layer of bonding paste move well to each other is also adjusted to produce the desired thickness of the first layer on the die. Shear is produced in the second layer to affect transfer of the bonding paste from the reservoir to the die. For larger dies, the die may enter and leave the paste more than once to produce individual plateaus spaced from the edge of the die.

13 Claims, 3 Drawing Sheets

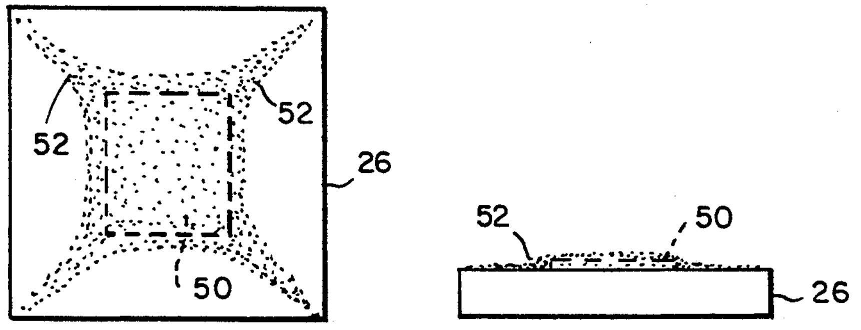
FIG. 2A
FIG. 2B
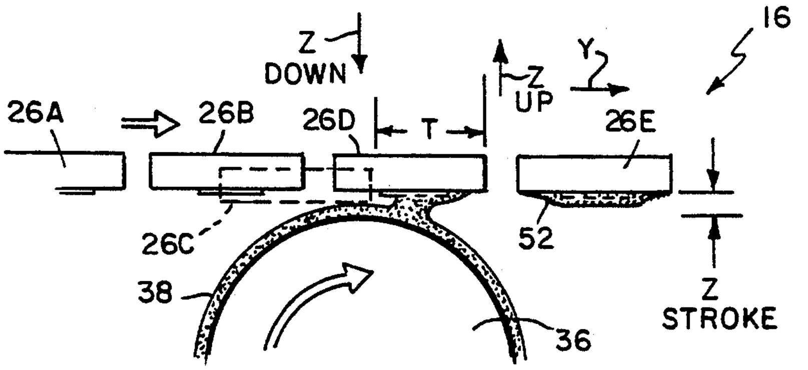
FIG. 3
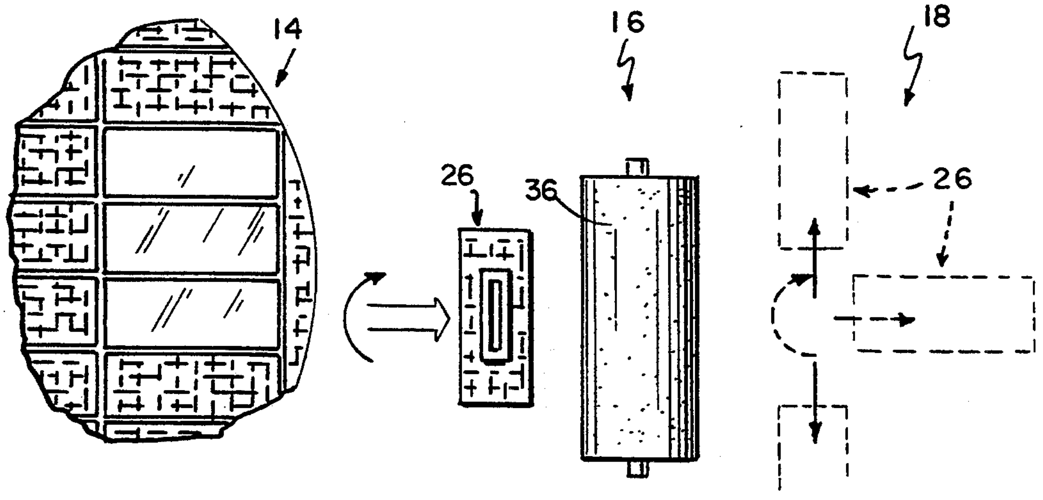
FIG. 4

DIE PASTE TRANSFER SYSTEM AND METHOD

BACKGROUND AND SUMMARY OF INVENTION

The present invention relates generally to paste systems and more specifically to a paste transfer system for transferring bonding paste or other material to an electronic die to be bonded to a substrate.

In bonding systems which bond a die to a substrate or a lead frame, the pattern for the bonding paste must be developed for each unique sized die. Generally the paste is applied as a plurality of dots resembling a shower head. To improve upon this process a star fish pattern has been used as described in U.S. Pat. No. 4,803,124 to KUNZ. Using either method, the pattern is specifically designed for the size of the die. This is not a problem on large runs, but for smaller runs through an automatic bonding machine, there is a lot of down time in developing the appropriate characteristics of the bonding paste pattern.

In prior systems, the bonding material is applied to the substrate or carrier surface generally prior to the bonding site as illustrated in U.S. Pat. No. 4,797,994 to Michaud et al. or at the bonding site as illustrated in U.S. Pat. No. 4,857,133 to Mullen. These systems apply the paste to a stationary substrate and thus increase the cycle time and reduce throughput.

The die paste may have a viscosity in the order of 20,000 to 100,000 CENTEPOISE. Typical examples of die paste are: silver glass composition, silver polyamide, gold substitute in glass, or glass paste alone. The handling and dispensing of these pastes is very difficult, as well as providing a uniformed layer without voids which trap air. A metering apparatus for dispensing silver glass paste is specifically described in U.S. Pat. No. 4,974,754 to Wirz.

Prior to the shower head application of paste on the substrate, paste was applied to the bottom of the die substrate by dipping a tool into a paste pot and then contacting the substrate. The paste pot generally included a disc which is rotated relative to a doctor blade to create a uniform layer of paste. Once the layer has been established, the disc is stationary and a die tool is dipped into the layer on the disc and removed to transfer a layer of paste to the die tool. The tool would then contact the substrate to transfer the paste to the substrate. The paste tool moved in tandem to the die pick up. The inability of these paste pots to form an appropriate layer of materials.

In addition to limitation that shower heads are designed for each specific size and shape of die, they also have the difficulty of forming patters on a small die sizes. Wherein multiple chips are provided in a single package or cavity, the shower head cannot provide these individual patterns much less in a common package. The alignment of the shower heads to the bond site offers another area for possible misalignment.

Thus an object of the present invention is to provide a paste transfer system which minimizes the set-up time.

Another object of the present invention is to provide a bonder paste system which increases through-put.

Still another object of the present invention is to provide a paste transfer system that can accommodate different size dies on a common substrate or package.

A further object of the present invention is to provide a paste transfer system wherein the bonding paste is applied to the die prior to being bonded to a substrate.

Still another object of the present invention is to provide a paste transfer system wherein the bonding paste is applied to the die on the fly.

An even further object of the present invention is to provide a paste transfer system designed for silver glass or other bonding adhesives which require shear for controlled transfer.

These and other objects of the invention are attained by a bonding system including a transport transporting a die from a supply location through a paste station in a controlled manner to a bonding site on the substrate. The paste station applies a first layer of bonding paste on a surface of the die as the die moves through the paste station. The control for the transport controls orientation which the die passes through the paste station and the orientation of the die at the bonding site. This allows the die to be oriented such that it passes through the paste station along as its shortest dimension while allowing reorientation before being bonded at the bonding site. A controller includes parameters for the die transport and the paste station as function of die size and implements the parameters as a function of the bonding sequence of dies. This allows changing of the pasting parameters on the fly for various size and a sequence of various size dies.

The paste station has a layer of bonding paste through which the die passes to form the first layer on the die. The height of the die is varied as it passes through the second layer. The speed at which the die and the second layer of bonding paste move relative to each other is also adjusted to produce the desired thickness of the first layer on the die. Preferably, the second layer is provided by a roller rotating into and out of a reservoir.

Shear is produced in the second layer to affect transfer of the bonding paste from the reservoir to the die. The shear is produced by a difference in speed between the die and the bonding paste layer as well as the angle of entry and angle of exit of the die to the paste. The speed of the roller and the speed of the die are controlled to produce the desired shear. For larger dies, the die may enter and leave the paste more than once to produce individual plateaus spaced from the edge of the die. The producing of shears is specifically important wherein the bonding paste is silver glass bonding paste.

A method for applying a bonding paste to an electronic die to be bonded to a substrate includes a) providing a first layer of bonding paste, and b) moving a die and the first layer into contact at a first surface of the die and relative to each other to create a shear in the first layer sufficient to form a second layer of bonding paste on the first surface of the die.

Other objects, advantages and novel features of the present invention will become apparent from the following detailed description of the invention when considered in conjunction with the accompanying drawings.

BRIEF DESCRIPTION OF THE DRAWINGS

FIGS. 2A and 2B are plane and side views, respectively, of a die with a paste pattern transferred according to the principles of the present invention;

FIG. 3 is a schematic representation of a paste transfer method according to the principles of the present invention;

FIG. 4 is a plan schematic view showing the rotation of a die between a wafer pick-up station and a paste station according to the principles of the present invention;

BEST MODE FOR CARRYING OUT THE INVENTION

Figure 1:
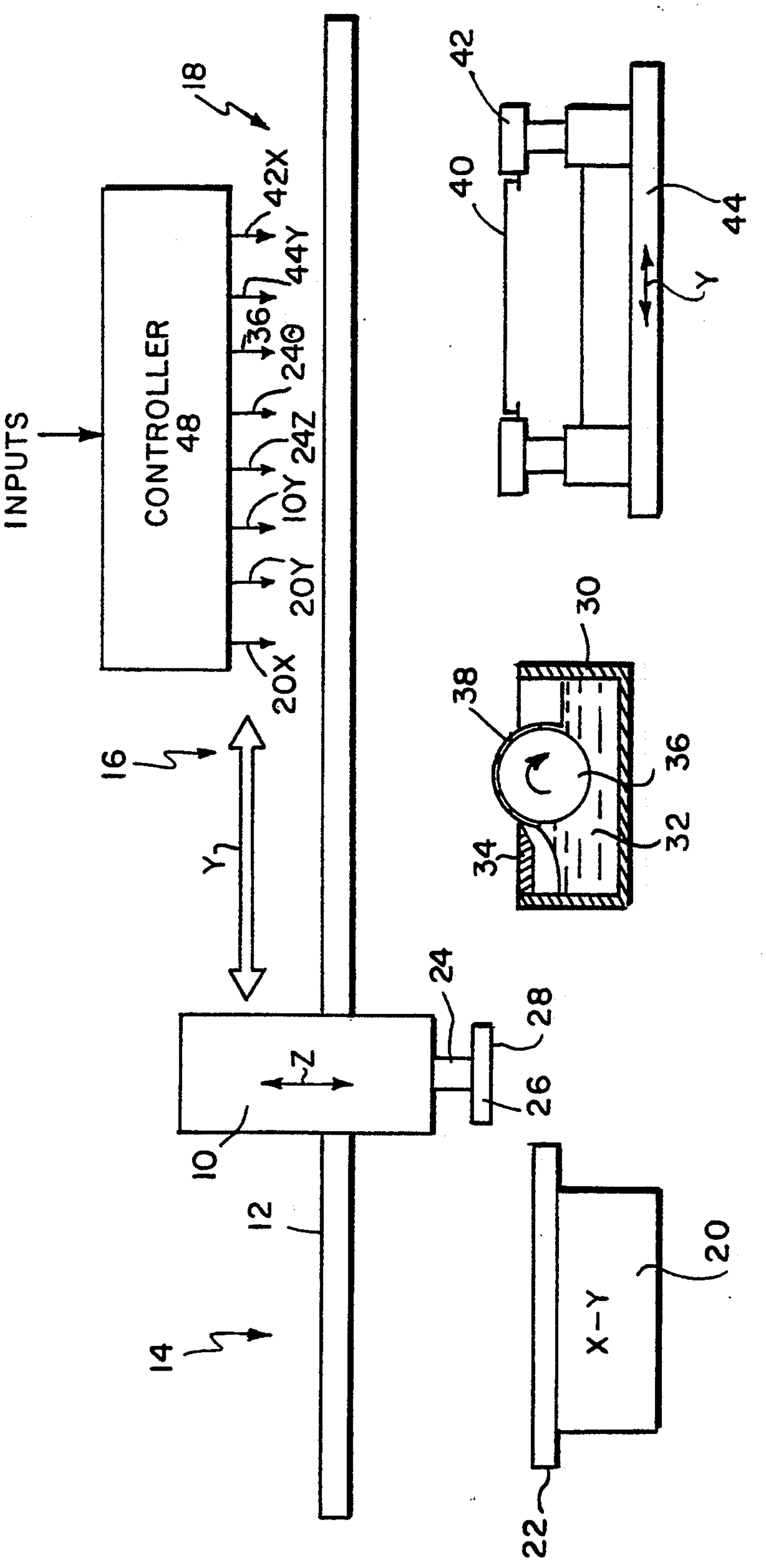
FIG. 1 shows a bonding system including a paste transfer station which incorporates the principle of the present invention.

A bonding system as illustrated in the Figure includes a die transport 10 riding on rail 12 between a wafer or pickup station 14 through a paste station 16 to a bonding station 18 where a die is bonded to a substrate. The wafer station 14 includes an X-Y table 20 to position the wafer 22 which includes a plurality of dies. The transport head 10 include a pickup or bond head 24 which extends down to and picks up die 26 which has been positioned by the X-Y Table 20. The bond head 24 is then raised and moved in the Y direction toward the bonding station 18. A die 26 is shown as being retained by the bond head 24 and having a bottom surface 28. During transport, paste is applied to the surface 28 of die 26.

The paste station 16 includes a reservoir 30 having paste 32 therein. A roller 36 has surface which rotates into and out of the reservoir and relative to a doctor blade plate 34 to form a layer 38 of bonding paste on the exterior of the roller 36. As the transport 10 moves continuously through the paste station 16, the surface 28 of the die 26 comes into contact with the layer 38 of paste to transfer a layer of paste onto a surface 28 of die 26 as it travels to the bonding station 18 or on the fly.

The bonding station 18 includes a substrate 40 or a boat which carries a substrate moved in the X direction in and out of FIG. 1 by rollers 42 on each side thereof. The rollers 42 are positioned on a table 44 which can position the substrate 40 along the Y axis. Once the transport 10 has come to rest at a preselected position at the bonding station 18, the head 24 is lowered to position the die 26 with the bonding material on surface 28 on a bonding site on the substrate. The appropriate pressure and time of application produces acceptable bonding.

The ability to apply the paste on the fly reduces the amount of time of a bonding cycle from pickup of the die 26 at the wafer station 14 through to its bonding at the bonding station 18. Also, no special pattern is required for the die 26 irrespective of its size or shape. This increases the through-put and reduces the set-up time for different dies. Also this paste system is not affected by the shape of the substrate 40 to which the die is bonded. Rotation of the roller 36 with respect to the reservoir 32 not only provides a fresh surface of paste to be transferred to the die 26, but also keeps the material, for example silver glass, in its appropriate state through the transfer to the die. Although this paste system was designed specifically to address the problems of silver glass, it may be used with any paste.

The paste transfer system of the present invention applies paste to the bottom of the die rather than generating a pattern in the package cavity. By using this method, the accurate location of the paste pattern to the die at bond is insured. The transfer of paste from the drum 36 depends upon many factors. The paste viscosity, the pates thixotropic characteristics, the silver flake size, the size of the die, and the thickness of the die all have an effect on the transfer characteristics of the system. The control system of the present invention has several built in features that give the operator a wide assortment of tools by which to generate the proper bond. The operator can adjust the following:

Bond Head Speed
Drum Speed
Paste to Drum direction
Depth of Plunge into the Paste
Position of paste Start
Position of paste Stop
Pulse up-down height while over drum
Pulse up-down frequency while over drum
Die pause while pulsing A controller 48, as shown in FIG. 1, receives the control parameters at a input. These parameters are stored as a function of die size. The controller 48 can also store a sequence of die sizes to be bonded. Thus the system can accommodate a change of die sizes on the fly for a new die size or for a sequence of die size changes. The controller 48 provides appropriate outputs to the various stations as a function of die size. As an alternative to inputting the control parameters as data, the controller 48 may include the capability to learn the parameters by the operator controlling the positioning of the moveable elements of the stations.

Figure 7:
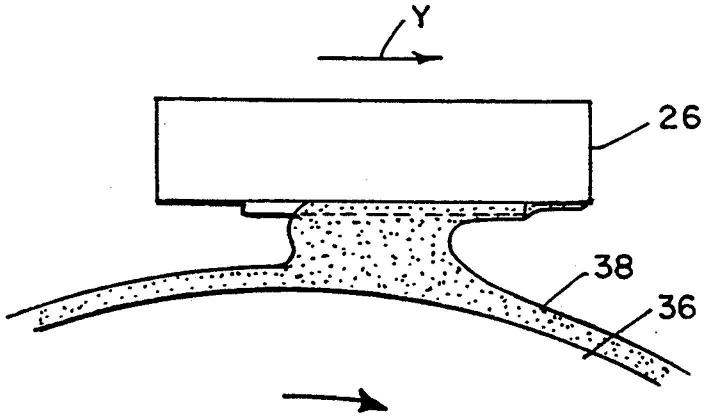
FIG. 7 is a schematic representation of a wave paste transfer method according to the principles of the present invention.

With small die, between 30 and 200 mils, a plateau pattern 50, as illustrated in FIGS. 2A and 2B, can be applied with proper adjustment of the above parameters. The plateau 50 results from silver glass paste's viscosity being related to its shear rate. This means that if silver glass paste is pulled apart slowly, it appears to be very viscus. However, if lots of shear is applied by trying to pull it apart quickly, it exhibits a very low viscosity. By starting the die 26 into the paste 38 just past the leading edge, (so as not to plow paste on to the front) and at a rate of speed about the same as the drum 36, paste will start to stick to the die 26. Continuing along at the same rate of speed and slowly leaving the drum 36, the paste sees very little shear and wants to pull back to the drum 36. Quickly lifting the die 26 from the drum 36, applies a high level of shear to the paste and the paste that is sticking to the die comes away with the die 26. Running the drum 36 faster than the die 26, a wave piles up under the die 26 and when pulled away quickly, a large lump of paste will stay with the die as illustrated in FIG. 7.

The sequence is illustrated in FIG. 3 with the die 26 at various positions between 26A through 26E at the paste station 16. The two boxes illustrate the position command for the transport 10 which has not been illustrated for sake of clarity. The die in position 26A and 26B are moving in the Y direction from the wafer pick up station 14 to the bonding station 18. At die position 26C, it is lowered down in the Z direction to start the transfer of paste. As previously described, this is past the leading edge of the die 26. After a time period illustrated as T, the die is raised up in the Z direction as illustrated by die position 26D ending the transfer. As illustrated in die position 26E, the die continues towards the bonding station 18 with the paste plateau 50 thereon.

As previously described, the depth Z may be adjusted as well as the amount of time T that the die surface 28 is traveling through the paste layer 38 on drum 36. Also, the relative speed between the die 26 and the layer 28 can be adjusted by adjusting the speed of the transport of the die 26 as well as the speed of rotation of the roller 36.

At the side edges of the die there is an area, just outside the die, where the paste experiences no increase in shear. Just inside the edge of the die the paste experiences a high rate of shear. This abrupt change in shear rate reduces the amount of paste that stays with the die. If the parameters are adjusted properly, then the result is the plateau shape 50 with ridges 52 running to the corners as shown in FIGS. 2A and 2B. The depth Z of plunge does not significantly affect the total paste transfer but will effect the side bars 52. Increased shear can also be generated by running both the drum 36 and the bond head 10 at higher speeds. Sometimes the paste is so cohesive (sticks to itself) at low drum speeds, that the paste will not even coat the drum no matter how large the doctoring blade gap. An increase in the speed of the drum 36 will add enough shear to the paste to reduce its cohesive strength and the drum will coat.

There is a limit to the bond length that this method of transfer handles well. As the die gets longer, the exit point is moved further along the die. The front of the die 26 exits the paste horizontally at a slow rate and the paste stays with the drum 36. If the die 26 is picked up too early, the front is pasted but the back has not yet been coated, or the plateau 50 is too far forward. Using paste with lower viscosity or less shear-rate sensitivity (less thixotropic) will help coat larger dies. If the die is long in one direction (rectangular), the control system will rotate the die 26 after pick up at wafer station 14, but prior to pasting. Since the placement can set +/−180°, the die can be rotated to any position after the paste station 16 to correct for any prepaste rotation. This capability always moves the die 26 across the drum 36 and apply paste in the direction of the short dimension of the die 26. In some cases, it may be desirable to enter the paste corner first. This has the effect of increasing the paste length and may be useful for very small die.

When die 26 exceed 400 mils with very thicksotropic pastes, other techniques may be employed to obtain good paste transfer. The first technique is to apply shear to the paste in order to lower its apparent viscosity. Many silver glass pastes will appear less viscus when subjected to high shear rates. The paste will remain viscus for a short time and then regain its high viscus properties. Since most silver glass paste is designed for shower head applicators requiring high initial viscosity with a quick recovery time, the present system provides a method of imparting shear to the paste layer 38 on the roller 36. The control system can pulse the die 26 as it moves through the paste at an operator select rate and amplitude.

Figure 5A:
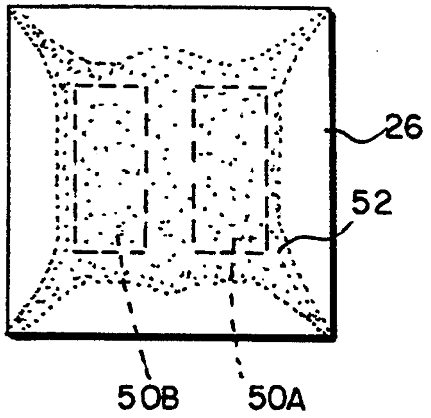
FIGS. 5A and 5B are plane and side views, respectively, of a die with a pair of paste patterns transferred according to the principles of the present invention.
Figure 5B:
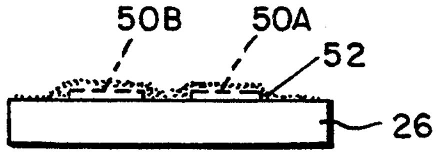

Use of the pulse system can be effective in many ways. A simple approach is to pulse slowly and at large amplitudes W. If two pulses are used of large W's (8 or greater mils) during the application of paste to a 300 mil die, the paste transfer system generates a pattern as if two 150 mil dies were being pasted one directly after another. Depending on the paste factors, this may be all that is required to apply two plateau type patterns as illustrated in FIGS. 5A and 5B. Three pulses may work where two do not. Experimentation with the speeds, start point, pulse rate and final pick-up point will generate a good pattern.

Figure 6:
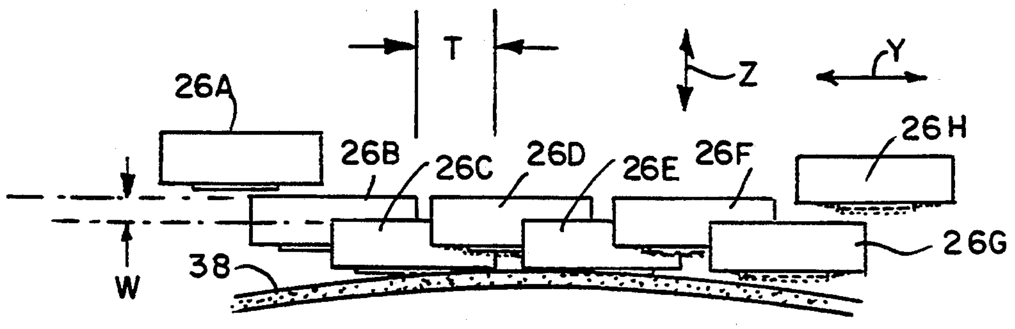
FIG. 6 is a schematic representation of a paste transfer method for plural plateau or shear inducing according to the principles of the present invention.

The method of the pulsation application is illustrated in FIG. 6. The die 26A is in its transport altitude traveling in the Y direction between the wafer pick-up station 14 through paste station 16 to the bonding station 18. The die position 26B differs from the die position 26A by the value Z which is the depth of the initial plunge. The pulsing begins by further moving from the 26B to the 26C position by the amplitude of the pulsing indicated as the value W. This alternates back up at 26D back down at 26E, and back up at 26F, and back down at 26G. Finally, to end the cycle, the die is moved to position 26H which is the original travel altitude. The pulse time is the measure of the time between the alternation from 26B to 26C. In addition to the previously described variables in the paste transfer system, the controls may also provide variation in the pulse up-down height W while over the drum, impulse up-down frequency determined by the pulse time and die pause while pulsing which is the down time.

When the die is large and requires a very thick coating, the low speed pulse will not be adequate. Reducing the pulse duration increases the pulse rate. At high pulse rates, enough shear is introduced to the paste on the drum that it become less viscus.

A wave of paste can be built up under the die in two ways. If the drum is running faster that the die across it, a wave of paste will build at the contact point. An even large wave can be produced by running the die across the drum in the direction opposite to the drum rotation as illustrated in FIG. 7. When pasting extremely large die, the die can be brought into position over the drum and paused. The die is lowered until it is just above the paste. Once the die is in position, the pulsing starts but the die does not move until the paste has had a chance to become less viscous. This pause can help to coat the front of the die by causing the paste to transfer at the start point rather than at some point further back. The normal start of transfer would be a position where the pulsing has had a chance to reduce the viscosity as the die moved along. It might be the case that in order to start transfer of paste close to the front, the front would have to plow into the paste. If this occurs, the front fillet may reach and over flow the top of the die. The pause can eliminate this problem.

The control of the paste transfer system requires the manipulation of the following parameters.

Z height at Epoxy
Paste Application Start Position
Paste Application End Position
Die Speed
Drum Speed
Pulse The depth that the die is plunged into the epoxy is set by first teaching the Epoxy Z stroke to have the die just touch the epoxy on the drum. The plunge into the epoxy is then adjusted by modifying the number of pulses in the Epoxy Z stroke by adding one pulse for every 0.002" of plunge desired, for example.

The position at which the die 26 enters the paste is adjustable. This position is usually slightly after the front of the die has past the center line of the drum 36 to keep the front from plowing into the paste. Sometimes the die moves faster than the drum. In this case, the front of the die should enter the paste well past the center line of the drum. The exact position will depend upon the width of the die.

The point that the die is lifted away from the paste is an important parameter in the set-up of a proper paste pattern. If the drum speed is higher than the die speed, if the die is not picked up soon enough, a wave of paste may over flow the back edge of the die. However, speed and back edge coating may not be the only or necessarily the primary consideration for die pick-up position. The position of pick-up will directly effect the pattern that is left on the die. In some applications, the plateau position and width can be adjusted by changing the point of pickup. To set the pick-up point, the paste delay time is entered. The distance the die moves across the paste for the paste delay time is a function of the relative speed of the bond head or die 26 and the roller 36. The bond head speed and the drum speed are entered.

To introduce some limited shear into the past at the application point, or to make a repetitive series of applications on a die, the bond head can be moved up and down in a pulsing motion as it passes across the paste. The Bond Head pulse (or Z Wave) can be adjusted for amplitude W and frequency. The cycle time is the time the head remains down or up and is set in milliseconds. The pulse is a square wave. The distance the die moves during a cycle depends upon the speed of the die. The faster the die moves the fewer pulses during pasting for a set cycle time.

The Z Wave stroke is the distance the die moves up and down. A positive value starts the die at the Z at Epoxy value and move the die up from this point. A negative value will move the die deeper. The value entered is in increment, for example, 0.002″.

Generally a low value in Z Wave frequency is used with a low value or negative value in Z Wave Stroke to impart shear into the paste. A high value in Z Wave Frequency and positive Z Wave stroke is used to make multiple applications on the same die.

Typical Drum setup parameters are shown in the table. The first two examples are for a single pulsing of the bond head where as the last two examples are a pulsating application. The difference between the signs of the Paste Start and Stop Positions in example one, two and four indicates that the die and roller are moving in the same Y directions, where as in example three, they are moving in the opposite Y direction.

| Manufacture No. | Ablebond | GMI 2569 | JMI 6100 | JMI 4720 |
|---|---|---|---|---|
| Paste Type | Expoxy | Silverglass | Silverglass | Silverglass |
| Die Size (mils) | 200 × 75 | 200 × 75 | 811 × 567 | 400 × 400 |
| Bond Head Speed | 337 | 337 | 100 | 100 |
| Paste Start Position | 1282 | 1282 | −259 | 1590 |
| Paste Stop Position | −1391 | −1391 | 2165 | −378 |
| Paste Stroke (Z) | 119 | 115 | 73 | 385 |
| Theta Rotation before Paste | 75 | 75 | 0 | 0 |
| Head Pulse Amplitude | 0 | 0 | −4 | 6 |
| Head Pulse Cycles | 0 | 0 | 50 | 3 |
| Drum Speed (pulse/sec) | 2985 | 2500 | 2400 | 1800 |
| Coating Thickness (mils.) | 0.75 | 3 | 8 | 6 |
| Coating Shape | continuous | single plateau | continuous | dual plateau |

Note: Where not specified, numbers represent motor pulses with respect to specific bond tool setup.

The control system has not been shown nor described in detail since the present system and method can be implemented on existing equipment with modification to include a paste transfer station. The computer control can be programmed to effectuate the operation.

Although the present invention has been described and illustrated in detail, it is to be clearly understood that the same is by way of illustration and example only, and is not to be taken by way of limitation. In the specification and claims, paste is used to mean any adhesive or bonding material. The spirit and scope of the present invention are to be limited only by the terms of the appended claims.

What is claimed is:

1. An apparatus for bonding an electronic die to a substrate comprising:

transport means for transporting a die from a supply location past a paste station to a bonding site on a substrate;

a paste station for applying a first layer of bonding paste on a surface of said die as said dies moves through a second layer of bonding paste in said paste station;

control means for controlling said transport means to pick up a die at said supply location, to move said die through said paste station and said second layer of bonding paste to provide said first layer of bonding paste on said surface of said die and to position said die surface having said first layer of bonding paste on said bonding site on said substrate; and wherein said control means controls the rotational orientation at which said die passes through said paste station and the rotational orientation of said die at said bonding site.

2. An apparatus according to claim 1 wherein said control means controls the speed at which said die passes through said second layer.

3. An apparatus according to claim 2 wherein said paste station includes means for moving said second layer of bonding paste relative to the path of said die; and said control means controls the speed of said second layer.

4. An apparatus according to claim 2 wherein said control means controls the height at which said die passes through said second layer.

5. An apparatus according to claim 2 wherein:

said paste station includes a reservoir of bonding paste and a roller having a surface which rotates into and out of said reservoir to provided a second layer of bonding paste; and said shearing means controls the speed of rotation of said roller and the speed at which said die passes over said roller to produce said shear.

6. An apparatus according to claim 5 wherein said shearing means rotates said roller in a direction opposite the direction at which said die passes over the roller to produce said shear.

7. An apparatus according to claim 2 wherein said shearing means varies the height of said die as said die passes through said second layer to produce said shear.

8. An apparatus according to claim 1 wherein said control means includes control parameters for said transport means and wherein said parameters vary according to the die size and the bonding sequence of dies.

9. An apparatus for bonding an electronic die to a substrate comprising:

transport means for transporting a die from a supply location past a paste station to a bonding site on a substrate;

a paste station including a reservoir of bonding paste and a roller having a surface which rotates into and out of said reservoir to provide a second layer of bonding paste;

a paste station for applying a first layer of bonding paste on a surface of said die as said dies moves through a second layer of bonding paste in said paste station; and control means, including control parameters for said transport means and said paste station wherein said parameters vary according to the die size, for implementing said parameters as a function of the bonding sequence of dies to move said transport means to pick up a die at said supply location, to move said die through said paste station and said second layer of bonding paste to provide a first layer of bonding paste on said surface of said die and to position said die surface having said first layer of bonding paste on said bonding site on said substrate.

10. An apparatus for bonding an electronic die to a substrate comprising:

transport means for transporting a die from a supply location past a paste station to a bonding site on a substrate;

a paste station for applying a first layer of bonding paste on a surface of said die as said dies moves through a second layer of bonding paste in said paste station; and control means for controlling said transport means to pick up a die at said supply location, to move said die through said paste station and said second layer of bonding paste while varying the height of said die as said die passes through said second layer to provide said first layer of bonding paste on said surface of said die and to position said die surface having said first layer of bonding paste on said bonding site on said substrate.

11. An apparatus for bonding an electronic die to a substrate comprising:

transport means for transporting a die from a supply location past a paste station to a bonding site on a substrate;

a paste station for applying a first layer of bonding paste on a surface of said die as said dies moves through a second layer of bonding paste in said paste station;

shearing means for producing shear in said second layer of bonding; and control means for controlling said transport means to pick up a die at said supply location, to move said die through said paste station and said second layer of bonding paste to provide said first layer of bonding paste on said surface of said die and to position said die surface having said first layer of bonding paste on said bonding site on said substrate.

12. An apparatus according to claim 11 wherein said control means varies the height of said die as said die passes through said second layer.

13. An apparatus according to claim 1 wherein said bonding paste is silver glass.

* * * * *

UNITED STATES PATENT AND TRADEMARK OFFICE

CERTIFICATE OF CORRECTION

PATENT NO. : 5,348,611

DATED : September 20, 1994

INVENTOR(S) : Edward T. Laurent, et al.

It is certified that error appears in the above-indentified patent and that said Letters Patent is hereby corrected as shown below:

On the title page item [75], correct the inventor's name to read as: Edward T. Laurent Signed and Sealed this Twenty-fifth Day of June, 1996

Attest:

BRUCE LEHMAN

*Attesting Officer* *Commissioner of Patents and Trademarks*